United States Patent [19]
Chamberlain et al.

[11] Patent Number: 5,221,964
[45] Date of Patent: Jun. 22, 1993

[54] ELECTRONICALLY EXPANDABLE MODULAR CCD CAMERA

[75] Inventors: Savvas G. Chamberlain; Brian C. Doody; William D. Washkurak; Paul T. Jenkins, all of Waterloo; Mike Miethig, Brampton; Sheldon Hood, Palmerston; Daryl Prince, Elmira, all of Canada

[73] Assignee: Dalsa Inc, Waterloo, Canada

[21] Appl. No.: 740,226

[22] Filed: Aug. 5, 1991

[51] Int. Cl.$^5$ .................................................. H04N 5/30
[52] U.S. Cl. ...................................... 358/229; 358/225; 358/209
[58] Field of Search ............... 358/209, 225, 226, 229, 358/99, 55

[56] References Cited

U.S. PATENT DOCUMENTS

| | | | |
|---|---|---|---|
| 4,394,692 | 7/1983 | Randmae | 358/229 |
| 4,485,398 | 11/1984 | Chapin et al. | 358/50 |
| 4,581,657 | 4/1986 | Takano | 358/285 |
| 4,769,711 | 9/1988 | Date | 358/229 |
| 4,967,281 | 10/1990 | Takada | 358/229 |
| 5,003,401 | 3/1991 | Otsuka | 358/229 |
| 5,040,068 | 8/1991 | Parulski et al. | 358/209 |

Primary Examiner—Michael T. Razavi
Assistant Examiner—Tuan V. Ho
Attorney, Agent, or Firm—Arne I. Fors; Jeffrey T. Imai; D. Doak Horne

[57] ABSTRACT

An electronically and mechanically expandable camera in which a tubular metal casing having removable front and back plates has a CCD image sensor mounted on a secondary front plate removably received within the casing for a direct thermal path to the casing. A driver board is removably receivable at a position between the secondary front plate and the back plate. A logic board is removably receivable at a position between the driver board and the back plate. The camera's functions may be expanded or altered by adding option electronic board modules between the logic board and the back plate of the camera, or by reconfiguring the logic board or by adding a different image sensor. All of the components within the camera, all of the enclosure elements and all of the mounting hardware used in the camera can be easily and conveniently changed as desired.

29 Claims, 7 Drawing Sheets

ELECTRONICALLY EXPANDABLE MODULAR CCD CAMERA

BACKGROUND OF THE INVENTION

This invention relates generally to electronic cameras and more specifically to an image sensing, electronically expandable modular CCD camera which can be adapted to a wide range of uses by the addition or variation of its electronic board components.

SUMMARY OF THE INVENTION

CCD (or charged coupled device) electronic image sensor cameras are known in the art. For example, EG&G Reticon describes Solid-State Camera Products in their Solid State Camera Product 1989 Catalog, 345 Potrero Avenue, Sunnyvale, Calif. 94086. Also Fairchild Weston CCD Data book 1989, 1801 McCarthy Blvd., Milpitas, Calif. 95035, describes CCD cameras. In addition Sierra Scientific and others have commercially available CCD cameras. Such cameras can be used in a wide range of applications such as gauging; scanning of bar codes on products when they are purchased; quality control in the production of plastic, MYLAR (trademark) or other films or webs; quality control of colors in the printing industry; and high speed document scanning and processing.

The camera of the present invention comprises a substantially tubular casing means having a front plate means removably attached at one end of the casing means, and a back plate means removably attached at the opposite end thereof. The front plate means has a hole therein for receiving an optical means such as a lens. An electronic driver board means is removably receivable within the casing means, at a position disposed between the front and back plate means and adjacent the front plate. A CCD sensor or other solid-state imager means is receivable within the electronic driver board means. An electronic logic board means is removably receivable within the casing means, at a position between the said electronic driver board means and said back plate means and adjacent the said electronic driver board (driver board) means.

The casing means, the front plate means, and the back plate means are designed to allow for expansion of the camera through the addition of option electronic board means. This allows for the customization of the camera for specific uses or function of the camera in areas which may not have been originally envisioned in the primary design process.

Additionally, any one of a plurality of different back plate means may be attached to the casing means, depending on the use to which the camera is to be put. The back plate means has a plurality of output ports disposed therein so that the user can obtain the required electronic output signals from the camera. If the camera is to be used in a different process or to obtain different output, the back plate means can simply be detached and the appropriate new back plate means attached to the casing.

Similarly, any of a plurality of solid-state sensor means can be inserted into the driver board means to adapt the camera to different uses. The electronic driver board means is withdrawn from the casing and an electronic driver board means with a different sensor means is installed to allow the camera's functions to be altered.

The camera may comprise option electronic boards means for specific operating functions of the camera. Examples of option electronic boards are an analog to digital converter board, a multiplexer board, a signal processing board and other electronic function boards. Any of a plurality of option electronic boards may be inserted into the camera between the logic board means and the back plate means to change the camera's functions and to achieve desired operation. The option electronic boards are linked to each other and to the sensor by a new and novel "option bus" means located on the electronic logic board means. The option electronic boards are also in thermal contact with the driver board means, and this allows for heat to be transferred from the electronic boards to the driver board means. The driver board means lies in contact with the front plate means; the front plate means and the driver board means being so disposed in relation to on another that heat transfer from the driver board plate means to the front plate means is possible. It is therefore possible for heat to be transferred from the inside of the camera to the front plate means. The front plate means can then be cooled in any suitable manner.

In order to accommodate the varying numbers of option electronic boards usable in the camera, different lengths of casing means may be utilized. Various adapters are also receivable within the hole in the front plate means to allow a range of optical devices to be connected to the camera.

Unlike previously known devices which required that a new customized camera be purchased in order to perform new functions or processes, the camera of the present invention may be expanded by simply changing the various option electronic boards to adapt the camera for new uses and to perform new functions. One of the advantages of the camera over the prior art is the interchangeability and replacement of not only the components within the camera, but of all the enclosure systems and mounting hardware used in the camera.

Furthermore, the arrangement of the interconnection of the various functioning parts of the camera are unique to the camera and provides for enhanced operation. The camera comprises three novel buses for electronic interconnect, namely a "driver bus", an "option bus" and a "user bus".

All three buses originate and can be found on the logic board means, their orientation being such that each bus occupies a separate side of the logic board means. The driver board means is connected to the driver bus. The option bus means allows each option electronic board to be placed vertically next to each other and to connect to each other. Vertical electrical connectors allows each option electronic board to be inserted vertically and connected to the logic board means through the option bus.

The user bus means connects the logic board means to the back plate means.

The unique protocol, or signals and pin arrangement, of each bus and the orientation of the said buses allows for an electronically expandable CCD camera with enhanced operational capabilities without "noise" contamination of the analog video signal by the digital electronics. Improved photosensitivity and improved dynamic range and spatial resolution are, therefore, possible.

BRIEF DESCRIPTION OF THE DRAWINGS

The preferred embodiment of the present invention will now be described with the aid of the following drawings, in which.

DETAILED DESCRIPTION OF THE PREFERRED EMBODIMENT

Figure 1:
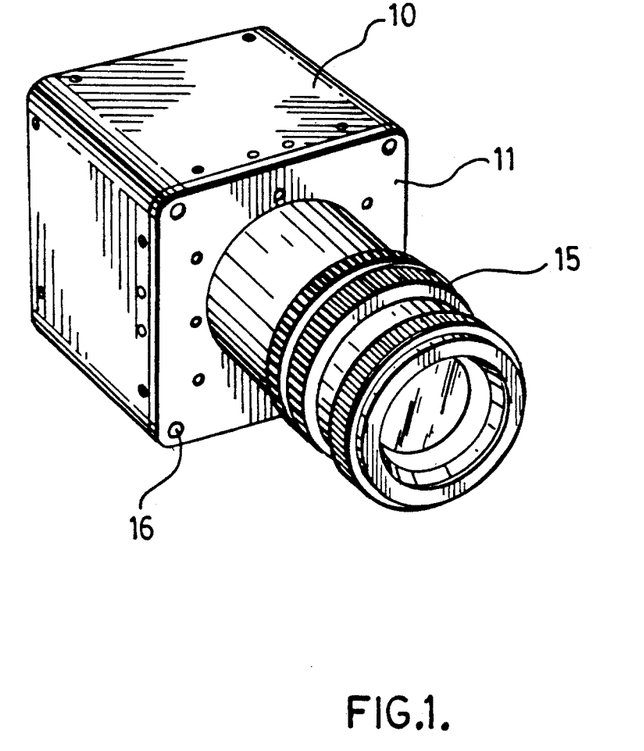
FIG. 1 is a perspective view of an electronically expandable modular CCD camera in accordance with the present invention.
Figure 2:
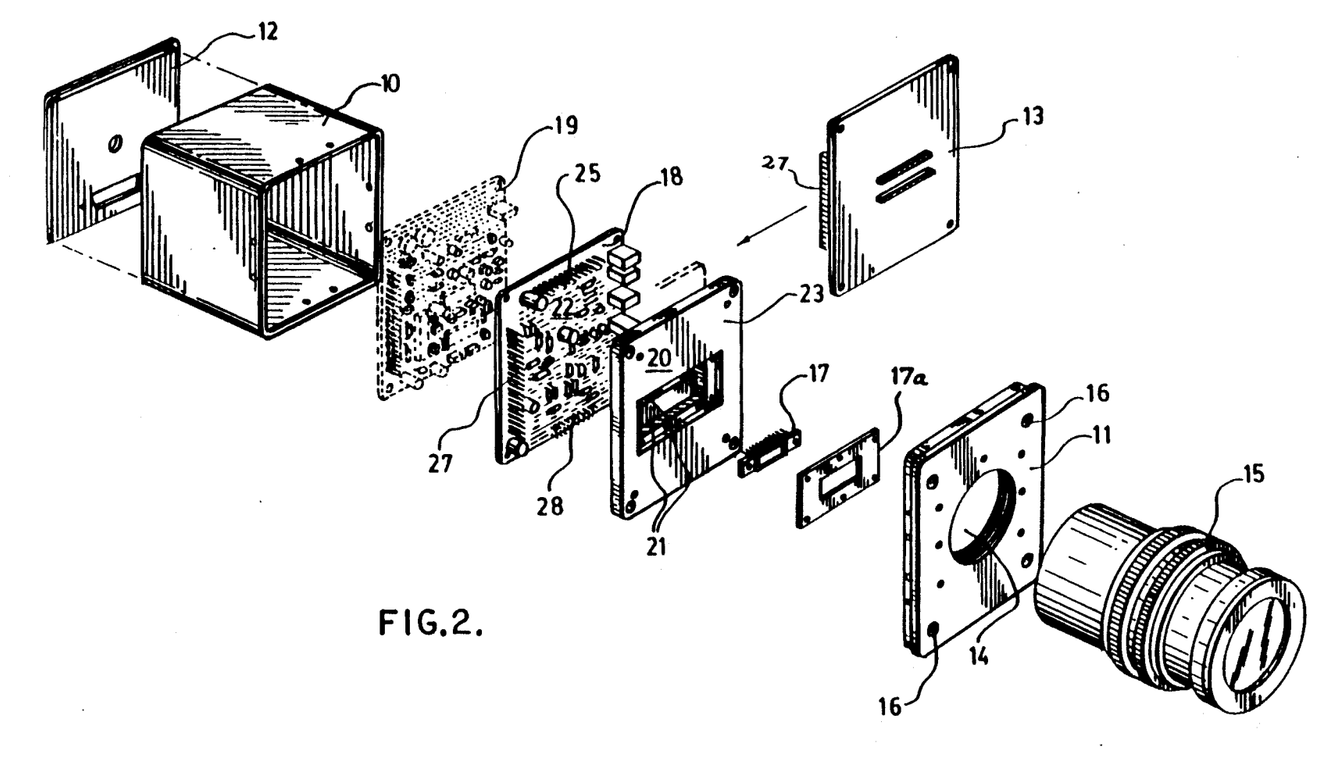
FIG. 2 is an exploded perspective view of the electronically expandable modular CCD camera.

Referring to FIGS. 1 and 2, the preferred embodiment of the present invention comprises a camera casing 10, which is substantially tubular when viewed in cross section, a front plate 11 removably attached at one end of the casing, and a back plate 12 removably attached to the opposite end thereof. A driver board means 13 is removably receivable within the casing 10 at a position disposed between the front plate 11 and back plate 12, and adjacent the front plate means.

The front plate 11 has a hole 14 therein to removably receive an optical device, such as a lens 15, and various adapters (not shown) may be connected to the hole 14 to allow different optical devices to be attached to the camera. The front plate 11 is secured to the casing 10 by way of a plurality of threaded holes 16.

The driver board means 13 is adapted to receive any of a plurality of image sensors 17 therein, the image sensor 17 can be changed if the camera is required to perform either a different function, or the same function in a different manner. Alternatively, the driver board means 13 with a different image sensor 17 may be changed.

Logic board means 18 is removably receivable within the casing 10 at a position disposed between driver board 13 and the back plate 12 and adjacent the driver board means.

Option electronic board means 19 (FIGS. 2 and 16) may be disposed between the logic board means 13 and back plate 12, the option electronic board means 19 being connected to the logic board means 18 by means of the option bus 27.

The image sensor 17 may be structured with either single or multiple electronic outputs. Any of a plurality of option electronic boards 19 may be mounted within the casing 10 to allow the camera to perform desired functions. The addition of option electronic boards 19 may necessitate the use of a longer casing 10.

A variety of different back plates 12 can be used to allow the user to obtain the required output from the camera. If the camera is to be transferred from one processing or manufacturing function to another, the back plate 12 can be changed by the user to provide the new desired output.

The various components of the camera of the present invention can be readily changed to allow the user to utilize the camera to monitor different manufacturing or processing systems or to have it perform different functions or produce different outputs for the end user.

In the preferred embodiment of the invention, the camera casing 10 is basically a square tube when viewed in cross section. A basic camera design uses a 3 inch long casing, but the internal expandability of the electronics of the camera may require that a longer casing be used. Casings up to 8 inches have been utilized, but it is conceivable that even longer casings can be used.

Figure 3:
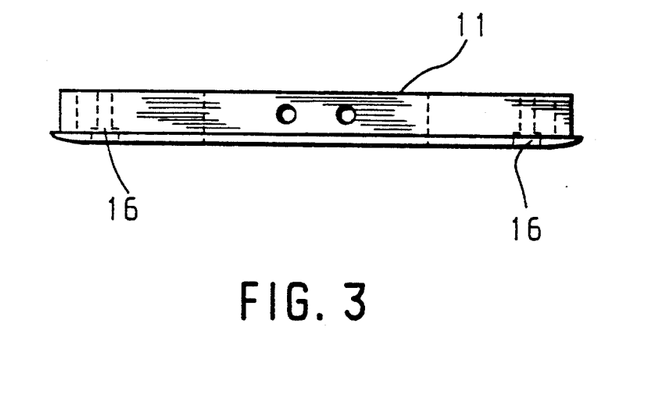
FIG. 3 is a side view of the front plate.
Figure 4:
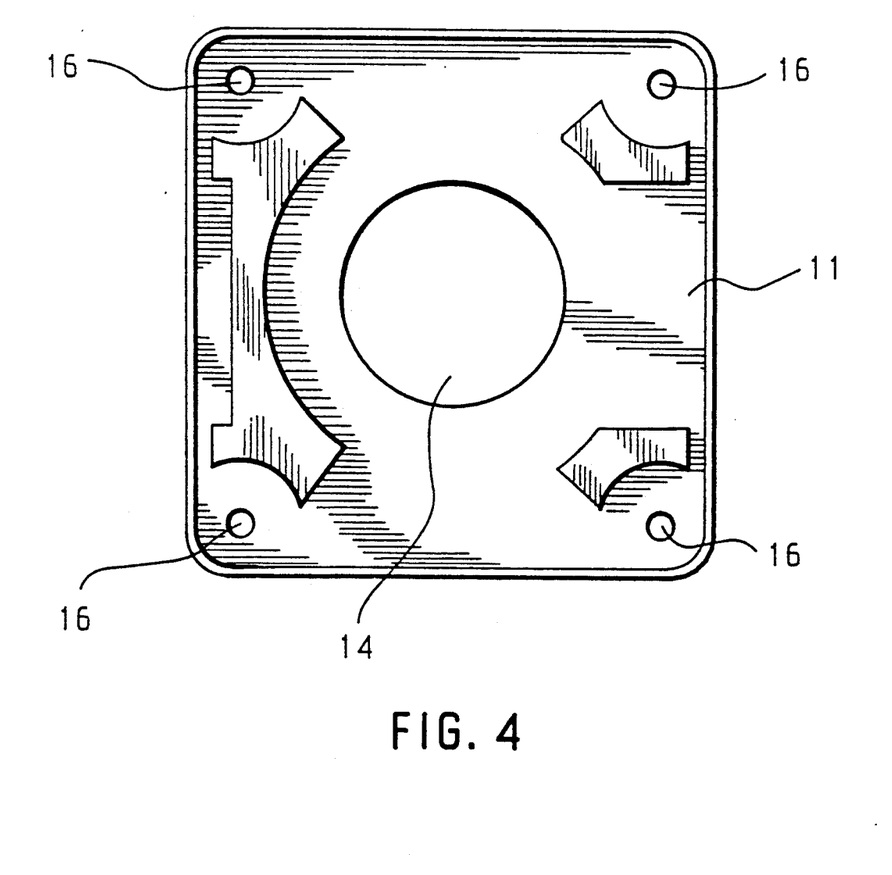
FIG. 4 is a rear view of the front plate.

In the preferred embodiment of the invention, the front plate 11 is a 3½ inch by 3½ inch aluminum component which is ⅜ thick and which serves as the main mounting area of the camera. If the camera is mounted to other systems by way of suitable attachment means disposed through holes 16 in the front plate 11. The front plate 11 has a threaded mounting hole 14 for the mounting of a lens 15 or any other optical component. This permits a higher accuracy of alignment to allow the user to optically align their system to the image sensor 17 within the camera.

Figure 5:
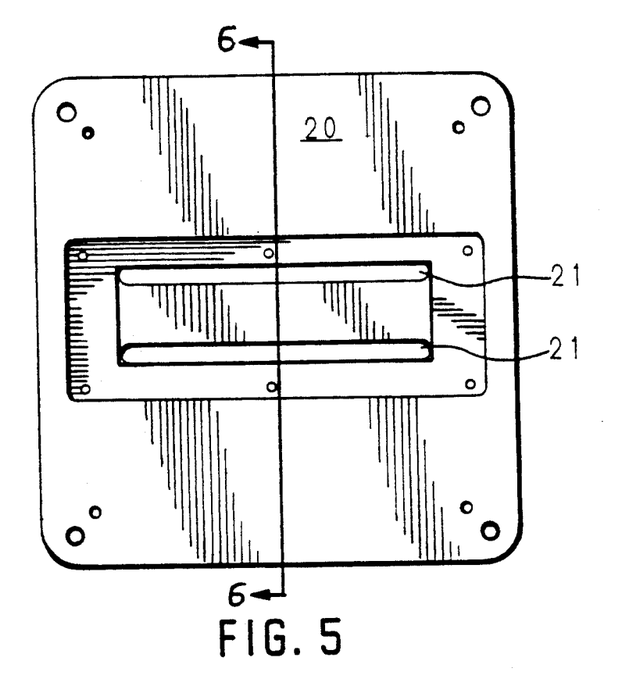
FIG. 5 is a front view of the driver board.
Figure 6:
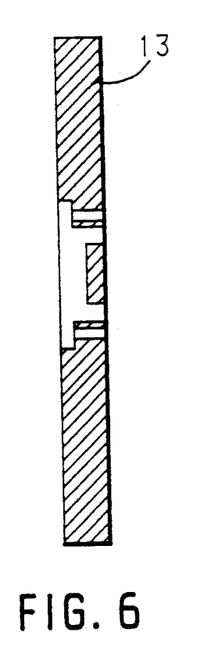
FIG. 6 is a cross section of the driver board through line 6—6 of FIG. 5.
Figure 7:
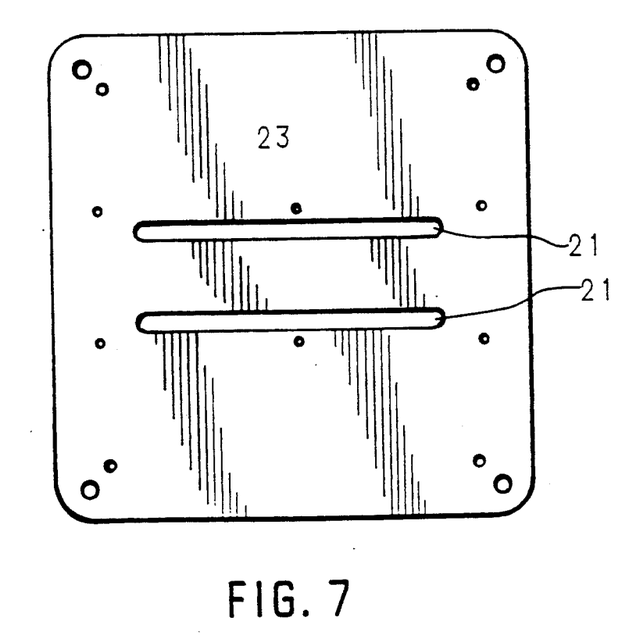
FIG. 7 is a rear view of the driver board.
Figure 8:
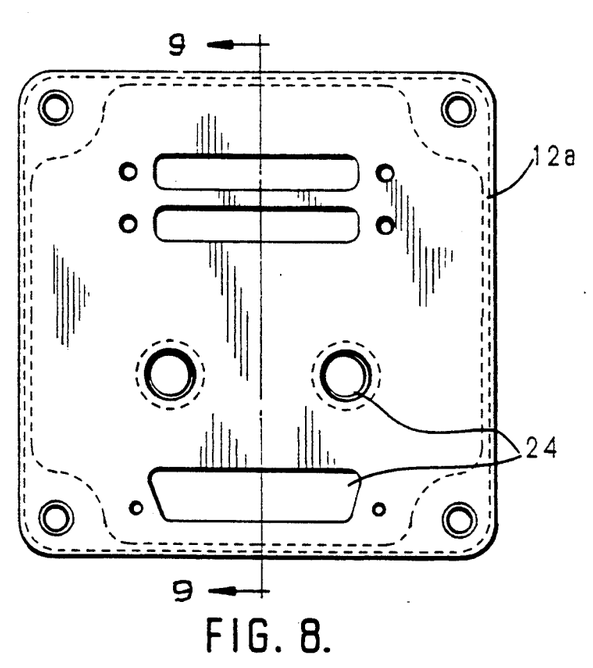
FIG. 8 is a rear view of a first embodiment of the back plate.
Figure 9:
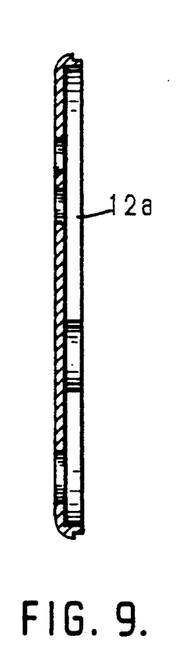
FIG. 9 is a cross section through line 9—9 of FIG. 8.
Figure 10:
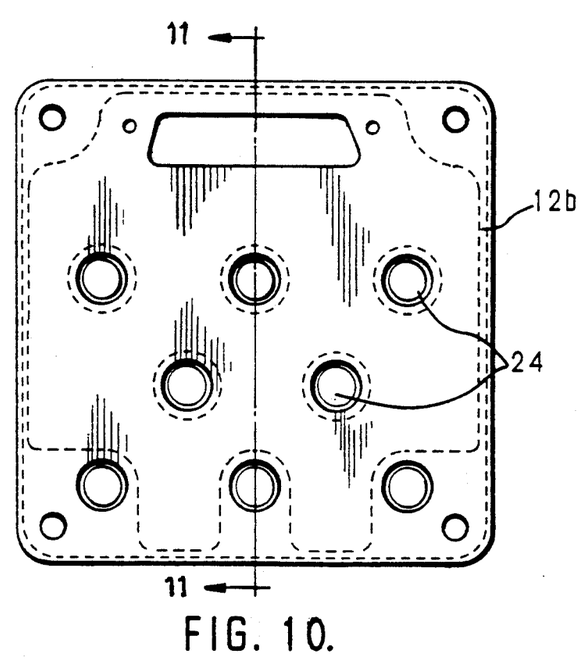
FIG. 10 is a rear view of a second embodiment of the back plate.
Figure 11:
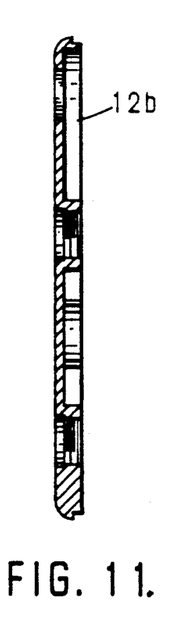
FIG. 11 is a cross section through line 11—11 of FIG. 10.
Figures 12, 13:
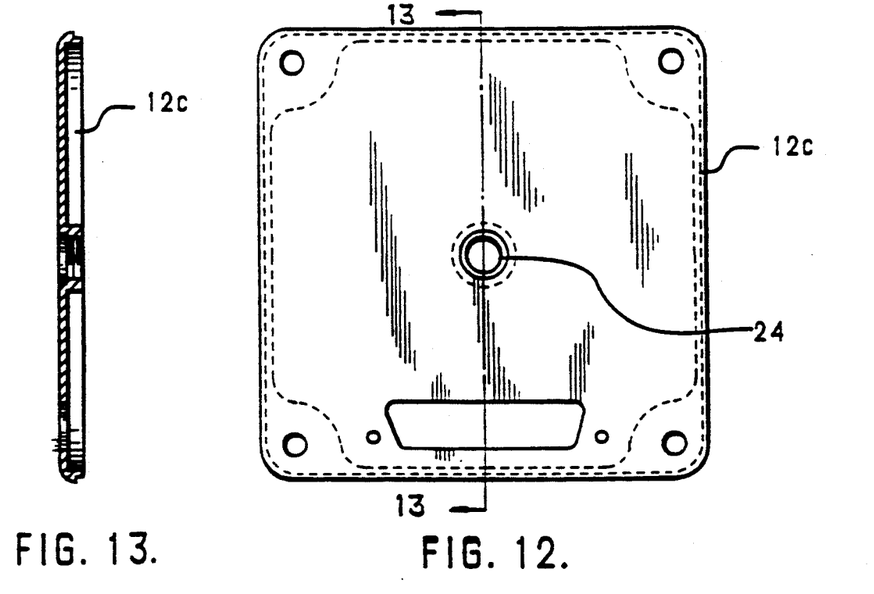
FIG. 12 is a rear view through a third embodiment of the back plate.
FIG. 13 is a cross section through line 13—13 of FIG. 12.
Figures 14, 15:
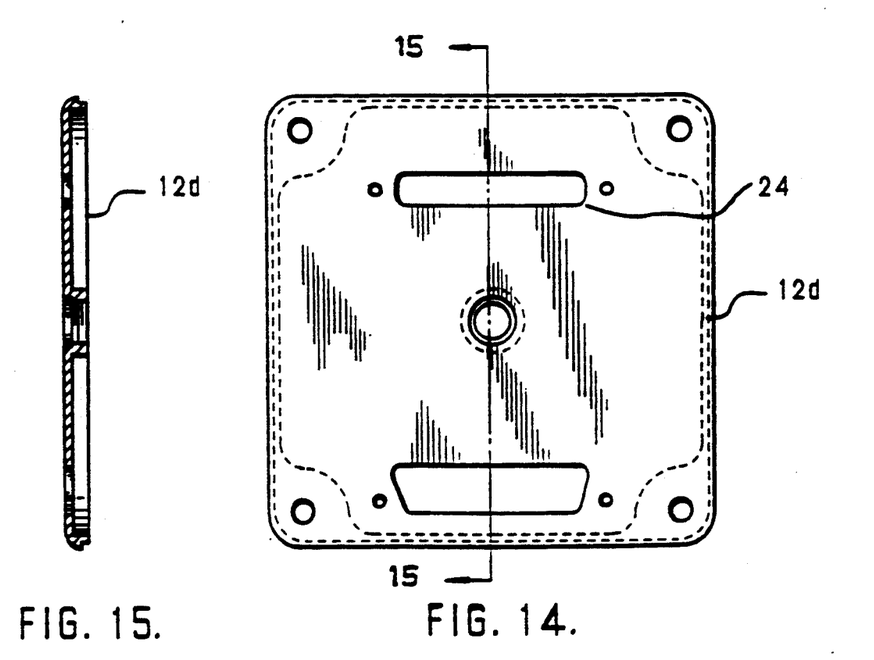
FIG. 14 is a rear view through a fourth embodiment of the back plate.
FIG. 15 is a cross section through line 15—15 of FIG. 14.

The driver board means 13 receives all the electrical connections of the image sensor 17 itself and the clock drivers. The image sensor 17 is mounted from the front 20 of the second plate through milled slots 21 in the second plate and held in place by means of imager clamp 17a by connectors such as screws, not shown. This permits a thermal contact area between the back 23 of the second plate means 20 and the image sensor 17 itself. The image sensor 17 generates a large proportion of the heat within the camera, so it is important to conduct that heat away from the image sensor 17 to maintain optimum performance of the image sensor. In addition, all the heat generating components on the option electronic boards 19 are in thermal contact with the second plate means 20. This thermal contact separates the heat generating components (not shown) from the remainder of the circuitry (not shown) and also directs the heat generating from those components away from the inside of the camera. The second plate means 20 mounts directly on to the front plate 11 of the camera (this means again that there is a thermal path from the second plate means 20 to the front plate 11). Thus the user who will be using the front plate 11 to mount the camera to his system (not shown) has a direct method to cool all the critical heat generating components in the camera. Substantially all the heat generated within the camera is cooled through the surface of the front plate and the housing to which it is connected. Cooling is through one surface only, thus making the camera cooling much simpler for the user.

The direct contact between the front plate 11 and the second plate means 20 allows for improved optical alignment. The image sensor 17, which is the optical image sensor in the camera and which may comprise for example a time delay and integration sensor, an area scan sensor, or a wide dynamic range sensor, is rigidly attached to the second plate means 20 and cannot move with respect to the second plate means 20. However, the second plate means 20 has a somewhat loose fit to the front plate 11 during the building of the camera. This loose fit allows the second plate means 20 to be moved with respect to the front plate 11 using high precision tooling fixtures. It is this feature which allows for the optical alignment of the camera. In other previously known cameras there is little or no optical alignment of the image sensor 17 itself. In the present invention through the use of this optical alignment procedure, the optical centre is coincident with the mechanical centre of the front plate means 11. This is important for replacement of products in the field: a user can replace portions of the camera or change the camera's functions and still have the same level of optical alignment without having to adjust his system.

The back plate 12 has a standard outside dimension, 3½ inches square. On the back plate are all the connectors 24 for the user. There are several different types of back plates (see FIGS. 8-15), but with the exception of different numbers of signal outputs, the mechanical fit of all back plates is identical. In the preferred embodiment of the invention there are approximately 4 or 5 different back plate connector configurations which are utilized in over 50 different camera designs. Any camera that is built can have the back plate replaced to allow the connector configurations to be changed without having to change any of the rest of the camera mechanics. This allows for the camera electronics to be upgraded or modified without having to replace entire sections of the camera.

The electronics of the camera is also expandable, this expandability being based on one of a series of internal buses. There are 3 internal buses. The term bus as used herein, is defined as an electrical and mechanical interface between two or more electronic circuit boards. It is as well defined in terms of the operation, timing and functionality of all the signals on the bus.

Figure 16:
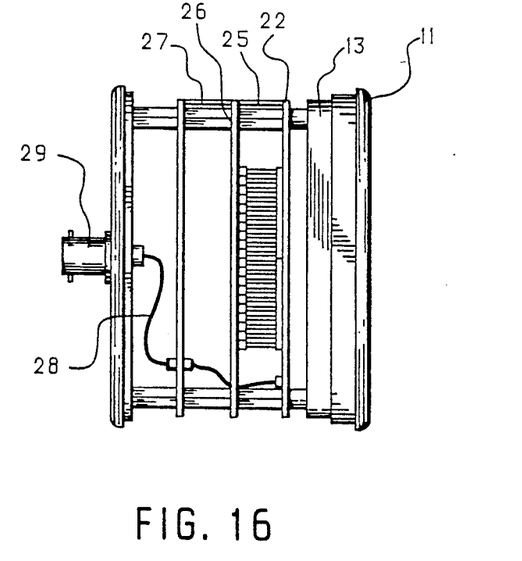
FIG. 16 is a partial side view of the camera showing the buses connecting a plurality of electronic boards.
Figure 17:
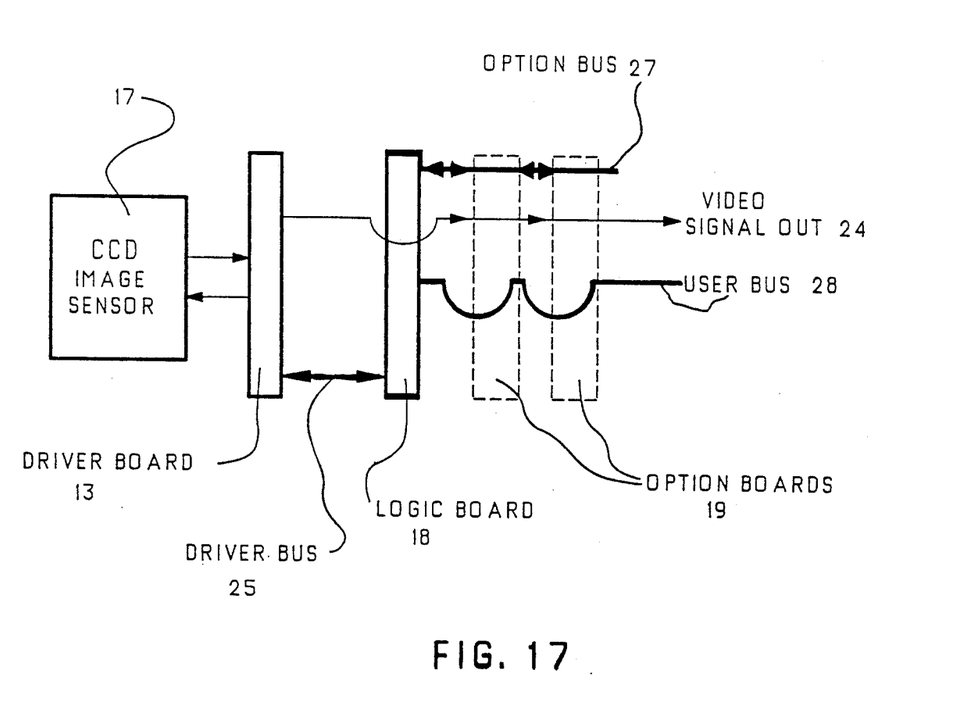
FIG. 17 is a block diagram of the components of an electronically expandable CCD camera according to this invention.

The first bus in the camera of the present invention is the driver bus 25. This connects the driver board means 13 that houses the image sensor to the logic board means 18 that generates all the digital timing for the image sensor 17 and the driver board means 13. This driver bus 25 has a unique arrangement of pins called a protocol, which provides for a critical separation of electronic functions. Following is the driver bus protocol:

| PIN NO. | NAME | FUNCTION |
|---|---|---|
| 1 | CLK1 | TTL LEVEL CLOCK RESERVED FOR RSTB |
| 2 | DGND | DIGITAL GROUND RETURN |
| 3 | CLK2 | TTL LEVEL CLOCK |
| 4 | DGND | DIGITAL GROUND RETURN |
| 5 | CLK3 | TTL LEVEL CLOCK |
| 6 | CLK4 | TTL LEVEL CLOCK |
| 7 | CLK5 | TTL LEVEL CLOCK |
| 8 | VCR | SHIFT REGISTER CLOCK HIGH DC SUPPLY |
| 9 | CLK6 | TTL LEVEL CLOCK |
| 10 | VCR | SHIFT REGISTER CLOCK HIGH DC SUPPLY |
| 11 | CLK7 | TTL LEVEL CLOCK |
| 12 | DGND | DIGITAL GROUND RETURN |
| 13 | VCC | +5V SUPPLY (DIGITAL) |
| 14 | CLK8 | TTL LEVEL CLOCK |
| 15 | VCR | SHIFT REGISTER CLOCK HIGH DC SUPPLY |
| 16 | CLK9 | TTL LEVEL CLOCK |
| 17 | VDD | DC SUPPLY FOR IMAGER |
| 18 | VBB | NEGATIVE DC POTENTIAL FOR IMAGER |
| 19 | CLK10 | TTL LEVEL CLOCK |
| 20 | AGND | ANALOG GROUND RETURN |

The second bus is the option bus 27. This provides interconnection between the logic board means 18 and one or more of the option electronic boards 19. Each option electronic board incorporates this option bus thereby allowing for interconnection between the various option electronic boards.

The option electronic boards are arranged in a pancake fashion which means they are stacked vertically the one after the other at approximately ¼ inch clearance. The camera can be expanded virtually infinitely in this manner to add features and vary the performance to the camera through various option electronic boards. By way of example, cameras incorporating the features of the present invention can be built without any option electronic boards having an effective thickness of about one inch. Other cameras which have been built have incorporated as many as 11 option electronic boards having an effective length of 6 to 8 inches. The only change required in the mechanical system of the camera is the replacement of the casing to accommodate the internal expansion.

The connectors of option bus 27 allow for vertical connection of the option electronic boards (not shown).

The option bus 27 has a unique protocol which allows for a signal sequence which allows for electronic expandability of the camera functions without degrading the performance of the camera. The protocol is designed to reduce the likelihood of digital signal contamination of the analog video signal thereby reducing the possibility of "noise" which has the effect of degrading spatial resolution, camera photosensitivity and dynamic range.

Following is the protocol of a preferred embodiment of an in-line 20 pin connector for the option bus 27 according to this invention. As further option electronic boards are developed, an expanded number of pins may be required and a variation of the protocol may result:

| PIN NO. | NAME | FUNCTION |
|---|---|---|
| 1 | DGND | DIGITAL GROUND RETURN |
| 2 | DGND | DIGITAL GROUND RETURN |
| 3 | TTL+5V | DIGITAL LOGIC POWER LINE |
| 4 | TTL−5V | DIGITAL LOGIC POWER LINE |
| 5 | ANA+15V | +15 VOLTS FOR ANALOG SIGNAL PROCESSING |
| 6 | ANA−15V | −15 VOLTS FOR ANALOG SIGNAL PROCESSING |
| 7 | CLAMP | TTL LEVEL SIGNAL WHEN LOW CAUSES THE OPTION BOARDS TO CLAMP THE VIDEO TO A REFERENCE VALUE |
| 8 | TRANSMIT | RESERVED TTL CONTROL |
| 9 | CONVERT | TTL LEVEL SIGNAL WHICH CAUSES THE OPTIONS TO CAPTURE THE VIDEO ON THE |

-continued

| PIN NO. | NAME | FUNCTION |
|---|---|---|
| 10 | CONVERTB | RISING EDGE TTL LEVEL SIGNAL OPPOSITE TO CONVERT |
| 11 | MAST CLK | TTL LEVEL CLOCK AT TWICE THE PIXEL RATE |
| 12 | LINE VAL | TTL LEVEL CLOCK RESERVED |
| 13 | MAST RST | TTL LEVEL CLOCK RESERVED |
| 14 | TCK | TTL LEVEL CLOCK RESERVED |
| 15 | A/D CONV | TTL LEVEL CLOCK DELAYED VERSION OF CONVERT |
| 16 | SPARE | RESERVED |
| 17 | ANA+5V | ANALOG +5 VOLT SUPPLY FOR SIGNAL PROCESSING |
| 18 | ANA−5V | ANALOG −5 VOLT SUPPLY FOR SIGNAL PROCESSING |
| 19 | AGND | ANALOG GROUND RETURN |
| 20 | AGND | ANALOG GROUND RETURN |

The third bus is the user bus 28 which connects the logic board means 18 to the DB-25 connector 29 on the back camera plate 12. The preferred protocol for the user bus 28 according to this invention is as follows:

| PIN NO. | NAME | FUNCTION |
|---|---|---|
| 1 | CLK1B | RS422 LEVEL CLOCK |
| 2 | CLK2 | RS422 LEVEL CLOCK |
| 3 | CLK3B | RS422 LEVEL CLOCK |
| 4 | CLK4B | RS422 LEVEL CLOCK |
| 5 | | FUTURE USE |
| 6 | CLK5 | RS422 LEVEL CLOCK |
| 7 | VSSD | DIGITAL GROUND |
| 8 | +5V | ANALOG +5V |
| 9 | +15V | ANALOG +15V |
| 10 | | FUTURE USE |
| 11 | VSSA | ANALOG GROUND |
| 12 | −5V | DIGITAL −5V |
| 13 | +5V | DIGITAL +5V |
| 14 | CLK1 | RS422 LEVEL CLOCK |
| 15 | CLK2B | RS422 LEVEL CLOCK |
| 16 | CLK3 | RS422 LEVEL CLOCK |
| 17 | CLK4 | RS422 LEVEL CLOCK |
| 18 | | FUTURE USE |
| 19 | CLK5B | RS422 LEVEL CLOCK |
| 20 | VSSD | DIGITAL GROUND |
| 21 | +15V | ANALOG +15V |
| 22 | −5V | ANALOG −5V |
| 23 | | FUTURE USE |
| 24 | VSSA | ANALOG GROUND |
| 25 | −15V | −5V TO −15V (−15V WITH OPTIONS) |

The placement or location of each bus is also an important feature of the design of the camera according to this invention. Each bus occupies a separate edge of the logic board means 18 with no two buses adjacent the same edge. This placement assists in reducing the possibility of "noise" contamination of the video signal by the digital signal, and, therefore, allows for closer arrangement of the option electronic boards. This achieves a compact, electronically expandable camera without sacrificing quality of performance.

Any remaining added option electronic boards 19 in the camera provide further signal processing of the video signal from the sensor 17. These include such options as multiplexing, analog-to-digital conversion and sample-and-hold data processing.

The option electronic boards 19 can be added to the camera at any time, either during the manufacturing phase, at the user site, or at any phase in the development cycle.

The camera of the present invention is, therefore, electronically expandable, and functionally interchangable on a mechanical and electronic level thereby changing the functional characteristics of the camera by the changing of the option electronic boards 19.

It will be appreciated by those skilled in the art that the selection of the unique protocol for each bus will require a unique "architecture" or design for the appropriate circuit boards. Each of the circuit boards, namely the driver board means 13, the logic board means 18 and the various option electronic board means 19 are uniquely designed to achieve the desired functional results according to the unique bus protocol selected.

Variations in the present invention will be obvious to those skilled in the art and such obvious variations are contemplated to fall within the scope and nature of the invention disclosed and claimed.

The embodiments of the invention in which an exclusive property or privilege is claimed are defined as follows:

1. An electronically expandable camera comprising:
   a tubular metal casing;
   a front plate having a rear face removably receivable at one end of said casing; said front plate having a hole therein for receiving an optical means;
   a second plate mounted on the rear face of the front plate for effective heat transfer from the second plate to the front plate;
   an optical means receivable in said front plate hole;
   a back plate removably receivable at the opposite end of the casing from the front plate;
   an electromechanical connector connected to the back plate;
   a driver board means removably receivable within said casing, said driver board means being disposed between said front plate and said back plate adjacent and abutting the second plate for effective heat transfer therebetween;
   an image sensor removably mounted on the second plate for thermal conductivity therebetween, and said image sensor being electrically connected to said driver board means;
   a logic board means removably receivable with said casing, said logic board means being disposed between said driver board means and said back plate adjacent the driver board means and having a driver bus means, a user bus means and an option bus occupying a separate edge thereof with not two buses adjacent the same edge;
   said driver bus means mounted on the logic board means mechanically and electronically interfaced between said logic board means and said driver board means for expandability to incorporate optional electronic boards;
   said user bus means mounted on the logic board means mechanically and electronically interfaced between said logic board means and the electromechanical connector on the said back plate; and
   said option bus mounted on the logic board means to allow for the incorporation of option electronic board means within said casing between said logic board means and the said back plate, whereby functionality of the camera is expanded to incorporate a plurality of optional board means.

2. An expandable camera as defined in claim 1 wherein the second plate is mounted within said casing in contact with said front plate to provide effective heat transfer away from the image sensor and to permit accurate optical alignment of the image sensor.

3. An expandable camera as defined in claim 1 wherein said front plate and driver board means are disposed in relation to each other so as to allow thermal transfer from the driver board means to the front plate for cooling of the image sensor in order to improve the performance of the image sensor.

4. An expandable camera as defined in claim 1 wherein said driver bus means, user bus means and option bus are functionally modular to permit:
the use of a plurality of image sensors, each offering optimum performance for a specific application;
the use of a plurality of option boards, to permit custom video output processing;
customized digital timing through the replacement of a single component within the camera; and
user customization of the camera.

5. An expandable camera as defined in claim 1 wherein said option electronic boards include a multiplexing board.

6. An expandable camera as defined in claim 1 wherein said option electronic boards include an analog-to-digital conversion board.

7. An expandable camera as defined in claim 1 wherein said option electronic boards include a sample-and-hold data processing board.

8. An expandable camera as defined in claim 1 wherein said camera is mechanically modular whereby the basic camera includes sufficient modularity to permit:
casing of differing lengths may be used to accommodate more or fewer option electronic boards;
second plates of different internal machining to permit the installation one of a plurality of sensors; and
back plates with different internal machining to permit the installation one of a plurality of electromechanical connectors suitable to the option electronic board installed.

9. An expandable camera as defined in claim 1 further comprising an adapter means receivable within the hole of said front plate means, said adapter means being adapted to receive a plurality of different optical means therein.

10. An expandable camera as defined in claim 1 wherein said optical means comprises a plurality of different types of camera lenses.

11. An expandable camera as defined in claim 1 further comprising an imager clamp fixable to the surface of the second plate which contacts the front plate for thermal contact between the image sensor and the second plate.

12. An expandable camera as defined in claim 1, wherein the option electronic board means abuts the driver board means for thermal contact between the electronic board means and the driver board means.

13. An expandable camera as defined in claim 1 further comprising an imager clamp means fixable to the second plate thereby positioning the image sensor in an optically accurate location and permitting efficient transfer of heat away from the image sensor.

14. An expandable camera as defined in claim 1 wherein the centre of the image sensor is alignable with the centre of the front plate means.

15. An expandable camera as defined in claim 1 wherein the casing can be selectively changed.

16. An expandable camera as defined in claim 1 wherein the front plate can be selectively changed.

17. An expandable camera as defined in claim 1 wherein the driver board means can be selectively changed.

18. An expandable camera as defined in claim 1 wherein the back plate can be selectively changed.

19. An expandable camera as defined in claim 1 wherein the option electronic board means can be selectively changed.

20. An expandable camera as defined in claim 1 wherein the orientation of the buses is designed to reduce analog noise contamination of the video signal.

21. An expandable camera as defined in claim 1 wherein the protocol of the driver bus is designed to reduce the analog noise contamination of the video signal.

22. An expandable camera as defined in claim 1 wherein the protocol of the option bus is designed to reduce the analog noise contamination of the video signal.

23. An expandable camera as defined in claim 1 wherein the protocol of the user bus is defined and implemented such that the camera in any one of its many expandable forms may interface to the same external electro-optical system without modification of the external system.

24. An expandable camera as defined in claim 1 wherein each option electronic board has an option bus to allow for vertical interconnect with the option bus on the logic board.

25. An expandable camera as defined in claim 1 wherein one of a plurality of different image sensor is receivable within said driver board means.

26. An expandable camera as defined in claim 25 wherein the image sensor is a CCD image sensor that is thermally connected through the second plate and the front plate to the users' system for increasing dynamic range and for reducing noise.

27. An expandable camera as defined in claim 25 wherein the image sensor is a time delay and integration sensor.

28. An expandable camera as defined in claim 25 wherein the image sensor is an area scan sensor.

29. An expandable camera as defined in claim 25 wherein the image sensor is a wide dynamic range sensor.

* * * * *